United States Patent
Bowman et al.

(10) Patent No.: US 10,693,639 B2
(45) Date of Patent: Jun. 23, 2020

(54) RECOVERING A KEY IN A SECURE MANNER

(71) Applicant: BlackBerry Limited, Waterloo (CA)

(72) Inventors: Roger Paul Bowman, Kitchener (CA); Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 67 days.

(21) Appl. No.: 15/445,872

(22) Filed: Feb. 28, 2017

(65) Prior Publication Data

US 2018/0248693 A1   Aug. 30, 2018

(51) Int. Cl.
| | |
|---|---|
| *H04L 9/08* | (2006.01) |
| *G06F 21/62* | (2013.01) |
| *H04L 9/14* | (2006.01) |
| *H04L 9/30* | (2006.01) |

(52) U.S. Cl.
CPC ........ *H04L 9/0894* (2013.01); *G06F 21/6209* (2013.01); *G06F 21/6245* (2013.01); *H04L 9/083* (2013.01); *H04L 9/0819* (2013.01); *H04L 9/0825* (2013.01); *H04L 9/14* (2013.01); *H04L 9/30* (2013.01)

(58) Field of Classification Search
CPC . H04L 9/0894; G06F 21/6245; G06F 21/6249
See application file for complete search history.

(56) References Cited

U.S. PATENT DOCUMENTS

| | | | | |
|---|---|---|---|---|
| 5,276,737 A | * | 1/1994 | Micali | G06Q 20/00 380/286 |
| 5,907,618 A | * | 5/1999 | Gennaro | H04L 9/0894 380/277 |
| 5,968,177 A | | 10/1999 | Batten-Carew et al. | |
| 6,058,188 A | * | 5/2000 | Chandersekaran | H04L 9/0894 380/286 |

(Continued)

FOREIGN PATENT DOCUMENTS

EP    2035997    9/2013

OTHER PUBLICATIONS

Denning et al., "A taxonomy for key escrow encryption systems," Communications of the ACM, Association for Computing Machinery, Inc., vol. 39, No. 3, XP058186614, Mar. 1, 1996, 7 pages.

(Continued)

*Primary Examiner* — Jason Chiang
(74) *Attorney, Agent, or Firm* — Fish & Richardson P.C.

(57) ABSTRACT

The present disclosure describes methods and systems, including computer-implemented methods, computer program products, and computer systems, for distributing recovery keys. One method includes: transmitting, from a first user device to a secure community server, a key distribution request, wherein the key distribution request identifies a second user device, and the first user device and the second user device are members of a same secure community managed by the secure community server; transmitting a first portion of a recovery key to secure community server for forwarding to the second user device; transmitting (Continued)

a second portion of the recovery key to the secure community server; and discarding the first portion and the second portion of the recovery key at the first user device.

12 Claims, 3 Drawing Sheets

(56) References Cited

U.S. PATENT DOCUMENTS

| | | | | |
|---|---|---|---|---|
| 6,061,454 | A * | 5/2000 | malik | H04L 9/0894 380/255 |
| 6,118,874 | A * | 9/2000 | Okamoto | H04L 9/0894 380/282 |
| 6,185,308 | B1 * | 2/2001 | Ando | H04L 9/0897 380/279 |
| 6,335,972 | B1 * | 1/2002 | Chandersekaran | H04L 9/0894 380/286 |
| 6,396,929 | B1 * | 5/2002 | Chandersekaran | H04L 9/0894 380/286 |
| 6,535,607 | B1 * | 3/2003 | Chandersekaran | H04L 9/0841 380/277 |
| 6,959,394 | B1 * | 10/2005 | Brickell | G06Q 20/206 380/44 |
| 7,350,069 | B2 | 3/2008 | Herz et al. | |
| 8,561,211 | B1 | 10/2013 | Woodward | |
| 8,892,881 | B2 | 11/2014 | Giuliani et al. | |
| 9,390,228 | B2 | 7/2016 | Reid | |
| 2003/0147536 | A1 | 4/2003 | Andivahis et al. | |
| 2004/0052377 | A1 * | 3/2004 | Mattox | H04N 7/163 380/277 |
| 2004/0228493 | A1 | 11/2004 | Kenneth | |
| 2005/0169479 | A1 * | 8/2005 | Ekstrom | H04L 9/083 380/277 |
| 2006/0282662 | A1 * | 12/2006 | Whitcomb | G06F 21/33 713/156 |
| 2008/0031460 | A1 * | 2/2008 | Brookner | H04L 9/085 380/282 |
| 2010/0146276 | A1 | 6/2010 | Jeong et al. | |
| 2013/0167191 | A1 * | 6/2013 | Barnett | G06F 21/604 726/1 |
| 2014/0108797 | A1 | 4/2014 | Johnson et al. | |
| 2016/0080157 | A1 * | 3/2016 | Lundstrom | H04L 63/126 713/176 |
| 2016/0337124 | A1 * | 11/2016 | Rozman | H04L 9/085 |

OTHER PUBLICATIONS

Extended European Search Report issued in European Application No. 18157961.6, dated Jun. 1, 2018, 9 pages.

Communication Pursuant to Article 94(3) issued in European Application No. 18157961.6, dated Jun. 19, 2019, 5 pages.

Communication Pursuant to Article 94(3) issued in European Application No. 18157961.6, dated Nov. 19, 2019, 6 pages.

* cited by examiner

RECOVERING A KEY IN A SECURE MANNER

TECHNICAL FIELD

The present disclosure relates to recovering security credentials in a telecommunication system.

BACKGROUND

In some cases, a user may use a key to access a device or a service. The key may be a password, a secret code, or any other security information that is used to authenticate the user. If the key is verified, the user can access the device or the service. Otherwise the access is denied. In some cases, the user may also receive a recovery key. The recovery key can be used to obtain the original key or reset the original key in case the user loses the original key. The recovery key may be generated on an electronic device of the user, or received by the electronic device of the user from a server.

DESCRIPTION OF DRAWINGS

Like reference numbers and designations in the various drawings indicate like elements.

DETAILED DESCRIPTION

In some cases, the recovery key is stored on an electronic device that is different from the electronic device that receives the recovery key. Therefore, if a user loses the key to access the electronic device, the user can retrieve the recovery from a holder, and use the recovery key to access the electronic device. In one example, a user receives the recovery key on the user's electronic device, and send the recovery key to an electronic device of a holder. In another example, the recovery key is generated on the user's electronic device and sent to the electronic device of a holder. The holder may be the user's friend, family member, or colleague. The user may discard the recovery key on his or her electronic device after the recovery key is sent. This approach may provide security for the recovery key, because an attacker targeting the electronic device of the user will not be able to obtain the recovery key.

In some cases, the holder may store the recovery key on holder's device. The electronic device of the holder, and therefore the recovery key on the electronic device of the holder, may be subject to attack. The user does not have control of the security exposure of the electronic device of the holder.

In some cases, the user's electronic device and the holder's electronic device can join a secure community managed by a security community server. A secure community can include a group of electronic devices that meet common security criteria. If an electronic device fails to meet the common security criteria, the electronic device can be removed from the secure community, and other electronic devices can receive a notification of the removal. Therefore, a user can send a portion of the recovery key to the holder's electronic device, and revoke the portion of the recovery key if the holder's electronic device fails to meet the common security criteria. Furthermore, the user can send another portion of the recovery key to the security community sever. This approach can provide additional security for the recovery key. FIGS. 1-5 and associated descriptions provide additional details of these implementations.

Figure 1:
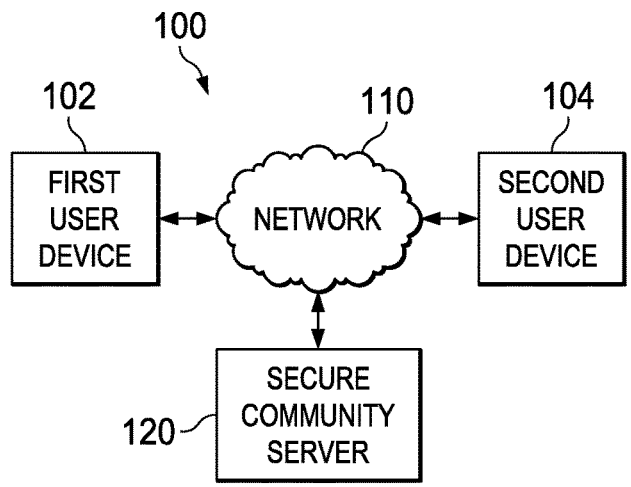
FIG. 1 is a schematic diagram showing an example system that distributes recovery keys according to an implementation.

FIG. 1 is a schematic diagram showing an example system 100 that distributes recovery keys according to an implementation. At a high level, the example communication system 100 includes a first user device 102 and a second user device 104 that are communicatively coupled with a secure community server (SCS) 120 over a network 110.

The SCS 120 represents an application, a set of applications, software, software modules, hardware, or any combination thereof that can be configured to manage secure communities. A secure community includes a group of members that share a common security policy. In one example, each member can be a user device, and the common security policy can include one or more security criteria for the user devices.

Examples of the security criteria can include hardware security criteria, software security criteria, security credential criteria, or any other security criteria. The hardware security criteria can include security criteria associated with the manufacturing process of the user device, e.g., whether the user device is manufactured by a credited manufacturer with approved security process, whether some of the components of the user device that are important for security are supplied by a credited component supplier. The hardware security criteria can also include security criteria associated with the hardware components of the user device, e.g., whether the processor has been fused to required security specifications or whether the user device includes special processors for encryption and decryption. The software security criteria can include security criteria associated with the operating system of the user device, e.g., whether the operating system executed on the user device includes certain security features or certain security patches, or whether certain security settings have been turned on or off for the user device. The software security criteria can include security criteria associated with the software on the user device, e.g., whether certain anti-malware application has been installed and executed on the user device, or whether the user device has installed insecure applications. The security credential criteria can include the security criteria associated with the certificate of the user device, e.g., whether the certificate is issued by approved certificate authorities, or security criteria associated with security settings, e.g., whether certain encryption or authentication algorithms are used and whether the strength of the encryption or authentication algorithms meets certain thresholds. Examples of other security criteria include privilege escalation, device history of being compromised or rooted, or the like.

In some cases, the SCS 120 can be part of an enterprise mobility management (EMM) server that manages mobile devices for an enterprise. The EMM server can install, update, and manage the license of enterprise applications. The EMM server can also set up one or more secure communities for one or more organizations of the enterprise and configure security policies for these secure communities. Alternatively, or in combination, the SCS 120 can be part of a server that provides one or more application services in a cloud.

A user device, e.g., the first user device 102 and the second user device 104 represents electronic devices that transmit recovery keys, receive recovery keys, or a combination thereof. In some cases, the user device can include a secure community client. The secure community client represents an application, a set of applications, software, software modules, hardware, or any combination thereof that can be configured to monitor security status on the user device. In some cases, the SCS 120 can query the security status of a user device by transmitting a security status inquiry to the secure community client on the user device. In some cases, the security status inquiry can be transmitted periodically. The secure community client can inspect the security status of the user device, e.g., checking the security setting of the operating system, obtaining the result of virus scanning software, or performing other processes that determine the security status of the user device. The secure community client can respond to the security status inquiry by transmitting a security status response indicating the current security status of the user device. Alternatively, or additionally, the secure community client can detect a breach of a security criteria, e.g., an installation of a suspicious application, a connection to a suspicious server, and report the breach to the SCS 120 without receiving a security status inquiry.

In some cases, if the SCS 120 determines that a user device no longer complies with the secure community, e.g., based on the report or response from the secure community client on the user device, the SCS 120 can remove the user device from the secure community. The SCS 120 can also transmit a notification to other members in the secure community to inform them that the particular user device has been removed from the secure community. In some cases, the removed user device can re-join the secure community if the removed user device can meet the security policy again.

Turning to a general description, a user device may include, without limitation, any of the following electronic device: computing device, mobile device, mobile electronic device, user device, mobile station, subscriber station, portable electronic device, mobile communications device, wireless modem, wireless terminal, or other electronic device. Examples of a mobile device may include a cellular phone, personal data assistant (PDA), smart phone, laptop, tablet, personal computer (PC), pager, portable computer, portable gaming device, wearable electronic device, health/medical/fitness device, camera, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," and "user device," can be used synonymously herein.

The example system 100 includes the network 110. The network 110 represents an application, set of applications, software, software modules, hardware, or combination thereof that can be configured to transmit data messages between the entities in the system 100. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

In one example, the first user device 102 can transmit a key distribution to the SCS 120. The key distribution request identifies the second user device 104. The first user device 102 and the second user device 104 are members of the same secure community managed by the SCS 120. The first user device 102 transmits a first portion of a recovery key to the SCS 120. In some cases, the transmitted first portion of the recovery key is encrypted using a public key of the second user device 104. The first user device 102 transmits a second portion of the recovery key to the SCS 120. In some case, the transmitted second portion of the recovery key is encrypted using a public key of the SCS 120. The first user device 102 discards the recovery key. The first user device 102 transmits a key recovery request to the SCS 120. In response to the key recovery request, the SCS 120 forwards the first portion of the recovery key to the second user device 104. The SCS 120 also transmits the second portion of the recovery key to the first user device 102. The second user device 104 transmits the first portion of the recovery key to the first user device 102. The first user device reconstructs the recovery key using the received first and second portions of the recovery key. FIGS. 2-5 and associated descriptions provide additional details of these implementations.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
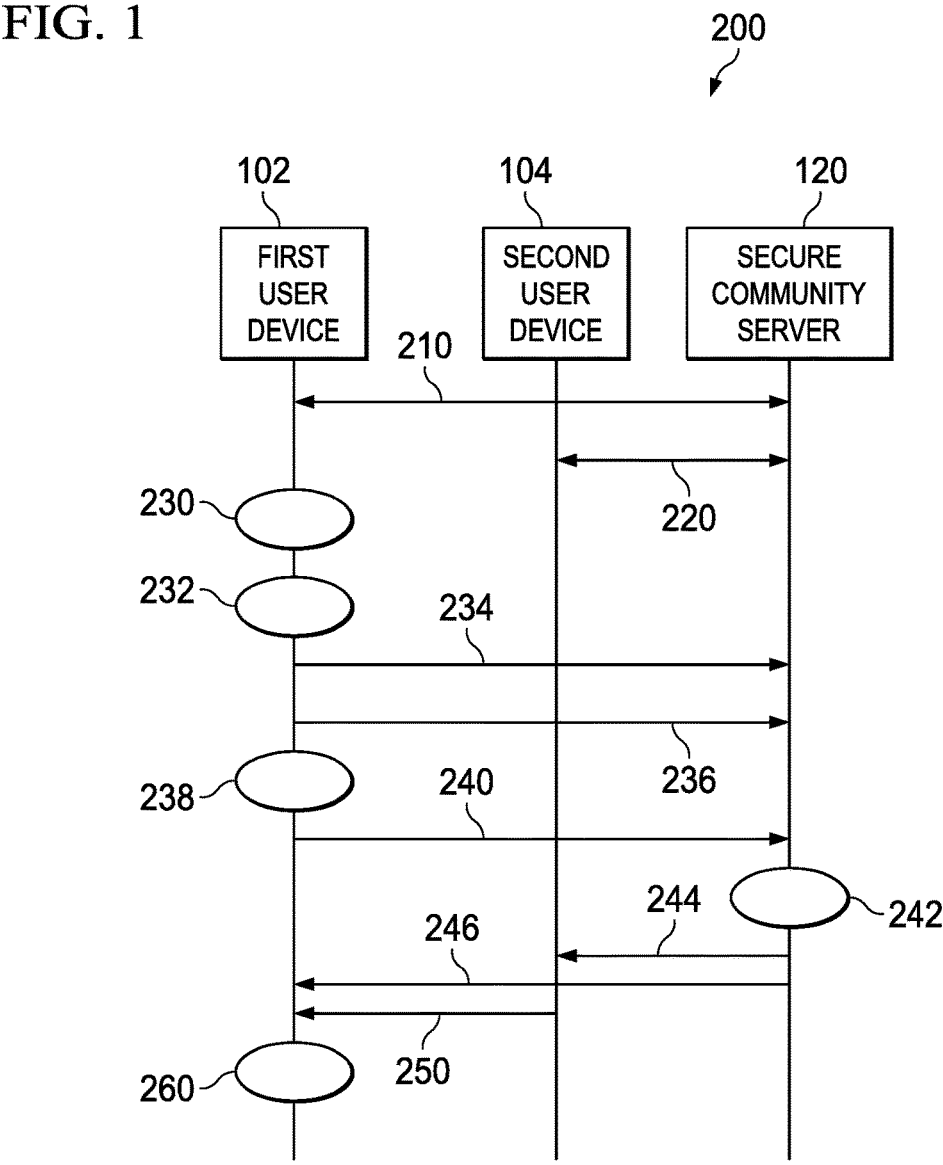
FIG. 2 is a flow diagram showing an example key recovering process according to an implementation.

FIG. 2 is a flow diagram showing an example key recovering process 200 according to an implementation. The process 200 can be implemented by one or more entities shown in FIG. 1, or any other systems or modules that provides key recovery functions. For example, the process 200 can be implemented by the first user device 102, the second user device 104, and the SCS 120. The example process 200, shown in FIG. 2, can also be implemented using additional, fewer, or different operations, which can be performed in the order shown or in a different order.

The example process 200 begins at 210, where the first user device 102 joins a secure community managed by the SCS 120. In some cases, the first user device 102 can join a pre-existing secure community. Alternatively or additionally, the first user device 102 can create a secure community, set the security policy for the secure community, and join the newly created secure community. In some cases, the first user device 102 sends a device identifier (ID) of the first user device 102 to the SCS 120. Examples of the device ID can include a Mobile Equipment Identifier (MEID), a Medium Access Control (MAC) number, a serial number associated with a certificate, or any other ID of a user device. In some cases, the first user device 102 also sends a public key of the first user device 102 to the SCS 120.

At 220, the second user device 104 joins the same secure community. The second user device 104 can send its device ID, public key, or a combination thereof to the SCS 120. In some cases, the device ID, the public key, or a combination thereof, of a member in a secure community is accessible to other members in the same secure community. In some cases, the secure community may assign a member ID to each member in the secure community, and the member ID can be public to any member in the same secure community.

At 230, a recovery key K is received at the first user device 102. In some cases, the recovery key K can be generated based on the input of a user of the first user device. For example, the user can enter a password to be used as the recovery key K. Alternatively or additionally, the recovery key can be generated using an key generation program. In one example, the key generation program can execute on the first user device 102 to produce a random string as the recovery key K. In another example, a server providing service for the first user device 102 can generate the recovery key K and send to the first user device 102.

At 232, the first user device 102 divides the recovery key K into two portions: K1 and K2. At 234, the first user device 102 transmits a key distribution request to the SCS 120 to request the SCS 120 to distribute a portion of the recovery key to another user device. The key distribution request can identify the user device, e.g., the second user device 104, as the destination for the portion of the recovery key. For example, the key distribution request can include the device ID or the member ID of the second user device 104. In some cases, more than one user devices can be assigned as the destinations of the portion of the recovery key. For example, the second user device 104 can be the primary holder of the recovery key, and one or more user devices in the same secure community can be the secondary holders. The portion of the recovery key can be sent to a secondary holder in case the primary holder fails to comply with the security policy of the secure community, cannot be reached, rejects the request to be a holder of recovery key for the first user device 102, or cannot hold the recovery key for any other reasons. In these or other cases, the first user device 102 can identify the primary and secondary holders and the order of distribution in the key distribution request or in a different message. In some cases, the recovery key K can be divided into more than two portions, and the additional portions can be distributed to additional holders.

The first user device 102 can transmit K1, in the key distribution request or in a different message, to the SCS 120 for distribution. In some cases, the first user device 102 can encrypt K1 using the public key of the second user device 104, and transmits the encrypted K1 in the SCS 120. Encrypting K1 can prevent other entities, including the SCS 120, from accessing K1, and therefore provides additional security.

In some cases, the SCS 120 forwards the received K1 to the second user device 104. The SCS 120 can check if the second user device 104 is in compliance with the security policy of the secure community prior to the forwarding. If the second user device 104 is in compliance with the security policy of the secure community, the SCS 120 forwards K1 to the second user device 104. If the second user device 104 is not in compliance with the security policy of the secure community, the SCS 120 will refrains from forwarding K1. The SCS 120 can transmit a notification to the first user device 102, indicating that the second user device 104 no longer complies with the security policy, and the first user device 102 can transmit another key distribution request identifying a different holder. In some cases, as discussed previously, the SCS 120 can forward K1 to a third user device that belongs to a secondary holder if the second user device 104 is not in compliance with the security policy of the secure community. In these cases, the SCS 120 can notify the first user device 102 that K1 is forwarded to the secondary holder.

Alternatively, as discussed below with regard to steps 240, 242, and 244, the SCS 120 can store the received K1, and forward K1 after receiving a key recovery request from the first user device 102. Holding K1 at the SCS 120 until the key recovery request can provide additional security. For example, the second user device 104 may be compromised after receiving K1, and therefore, reducing the time that the second user device 104 holds K1 can provide additional protections.

At 236, the first user device 102 transmits K2 to the SCS 120. In some cases, the first user device 102 can encrypt K2 using the public key of the SCS 120, and transmits the encrypted K2 to the SCS 120. Encrypting K2 can prevent entities other than the SCS 120, from accessing K2. At 238, after K1 and K2 are transmitted, the first user device 102 discards the recovery key K. In some case, the first user device 102 discards the recovery key K by removing any portions of the recovery key K, e.g., K1 and K2, from the memory of the first user device 102.

At 240, the first user device 102 transmits a key recovery request to the SCS 120. The key recovery request indicates that the first user device is requesting to retrieve the recovery key. In some cases, the first user device 102 can transmit separate key recovery requests for K1 and K2. Alternatively, the first user device 102 can transmit one key recovery requests for both. In some cases, the key recovery request can identify the holder of K1, in this case, the second user device 104.

At 242, the SCS 120 can check if the second user device 104 is in compliance with the security policy of the secure community. If the second user device 104 is in compliance with the security policy of the secure community, at 244, the SCS 120 forwards K1 to the second user device 104. If the second user device 104 is not in compliance with the security policy of the secure community, the SCS 120 refrains from forwarding K1. The SCS 120 can transmit a notification to the first user device 102, indicating that the second user device 104 no longer complies with the security policy. Once the second user device 104 no longer complies with the security policy, the second user device 104's status as a holder is revoked. The first user device 102 can transmit another key distribution request identifying a different holder.

In some cases, as discussed previously, the SCS 120 may distribute K1 to the second user device 104 after receiving K1 at 234 but prior to receiving the key recovery request at 240. In these cases, the SCS 120 can transmit a key recovery notification to the second user device 104, indicating that the first user device 102 has requested K1.

At 246, the SCS 120 transmits K2 to the first user device 102. In some cases, as discussed previously, K2 was encrypted using the public key of the SCS 120. In these or other cases, the SCS 120 can decrypt the encrypted K2 using its private key and obtains the unencrypted K2. The SCS 120 can transmit the unencrypted K2 to the first user device 102. In some cases, the SCS 120 can re-encrypt the unencrypted K2 using the public key of the first user device 102, and transmits the re-encrypted K2 to the first user device 102. Re-encrypting K2 with the public key of the first user device 102 can prevent entities other than the first user device 102 from accessing K2.

At 250, the second user device 104 transmits K1 to the first user device 102. In some cases, as discussed previously, K1 was encrypted using the public key of the second user device 104. In these or other cases, the second user device 104 can decrypt the encrypted K1 using is private key and obtains the unencrypted K1. In some cases, the second user device 104 can transmit K1 directly to the first user device 102, e.g., using near field communication (NFC), Bluetooth, infrared, cable, wireline or wireless telecommunication network, or any other communication technologies. In some cases, the second user device 104 can transmit K1 to the SCS 120 and the SCS 120 can forward K1 to the first user device 102. In some cases, the second user device 104 can re-encrypt the unencrypted K1 using the public key of the first user device 102, and transmits the re-encrypted K1 to the first user device 102. Re-encrypting K1 with the public key of the first user device 102 can prevent entities other than the first user device 102 from accessing K1. Alternatively or in combination, K1 can be transmitted out-of-band. For example, a user of the second user device 104 can call or send a message to the user of the first user device 102 to deliver K1.

At 260, the first user device 102 reconstructs the recovery key K using the received K1 and K2.

Figure 3:
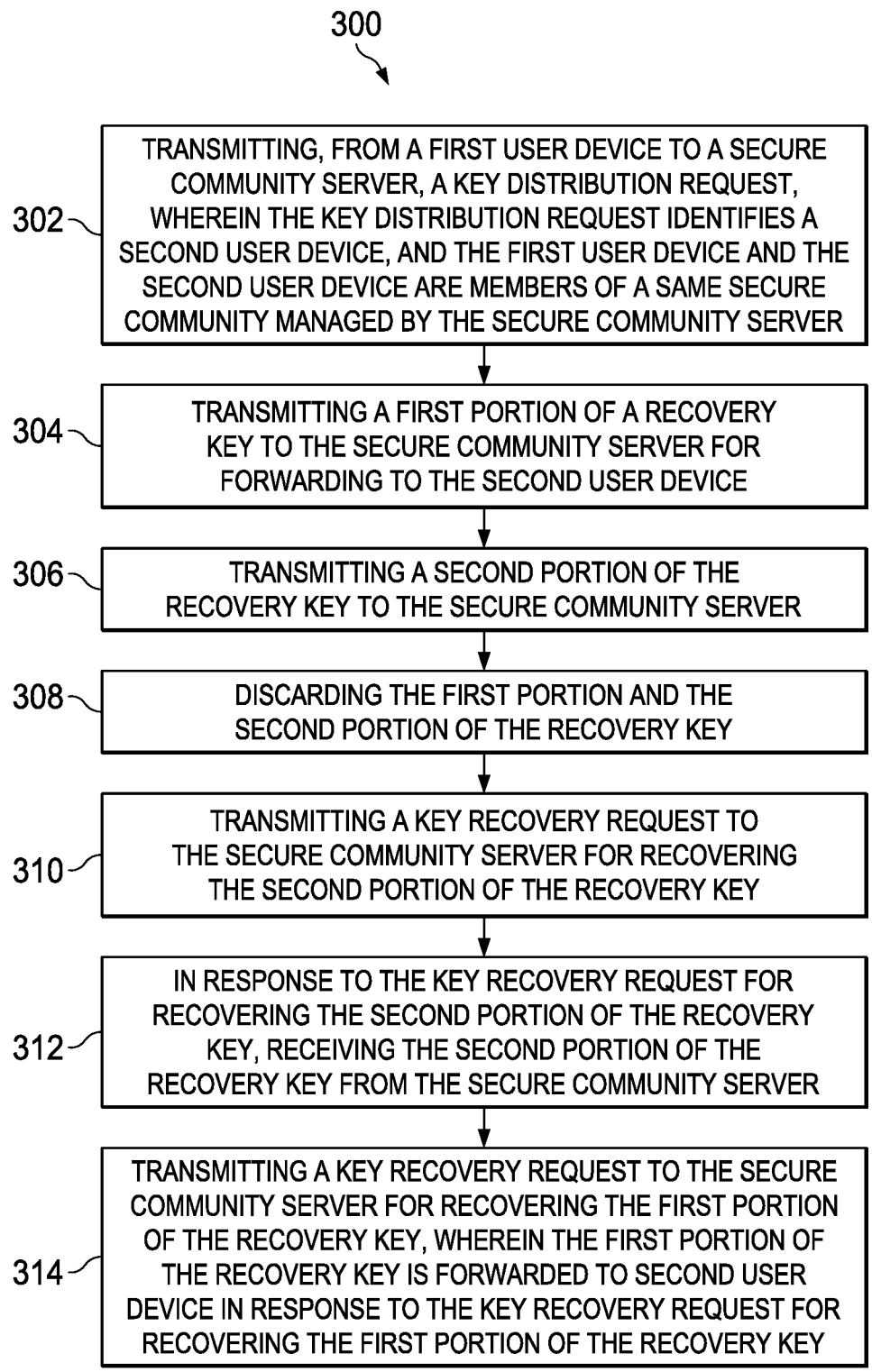
FIG. 3 is a flow diagram showing an example method for distributing a recovery key according to an implementation.

FIG. 3 is a flow diagram showing an example method 300 for distributing a recovery key according to an implementation. The method 300 can be implemented by one or more entities shown in FIG. 1, or any other systems or modules that distributes recovery keys. For example, the method 300 can be implemented by the first user device 102. The example method 300, shown in FIG. 3, can also be implemented using additional, fewer, or different operations, which can be performed in the order shown or in a different order.

The example method 300 begins at 302, where a key distribution request is transmitted from a first user device to a secure community server. The key distribution request identifies a second user device, and the first user device and the second user device are members of a same secure community managed by the secure community server.

At 304, a first portion of a recovery key is transmitted to the secure community server for forwarding to the second user device. In some cases, the transmitted first portion of the recovery key is encrypted using a public key of the second user device.

At 306, a second portion of the recovery key is transmitted to the secure community server. In some case, the transmitted second portion of the recovery key is encrypted using a public key of the secure community server.

At 308, the first user device discards the first and the second portions of the recovery key.

At 310, a key recovery request is transmitted to the secure community server to recover the second portion of the recovery key.

At 312, in response to the key recovery request, the second portion of the recovery key is received from the secure community server. In some cases, the received second portion of the recovery key is encrypted using a public key of the first user device.

At 314, a key recovery request is transmitted to the secure community server to recover the first portion of the recovery key, and the first portion of the recovery key is forwarded to second user device in response to the key recovery request to recover the first portion of the recovery key. In some cases, the key recovery request to recover the first portion of the recovery key can be the same key recovery request to recover the second portion of the recovery key described at 308.

Figure 4:
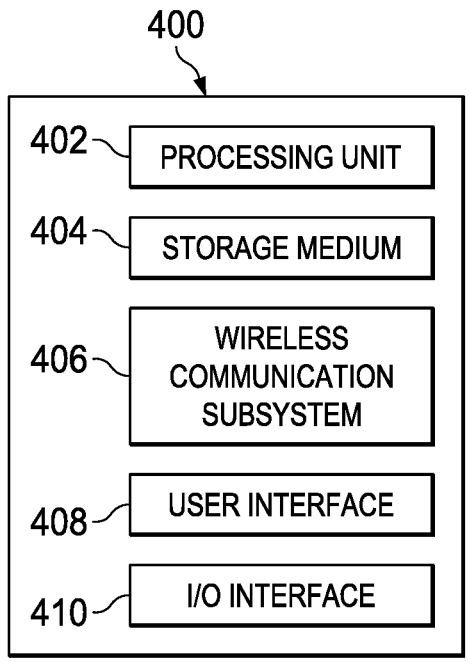
FIG. 4 is a block diagram illustrating an example user device according to an implementation.

FIG. 4 is a block diagram illustrating an example user device 400 according to an implementation. The illustrated device 400 includes a processing unit 402, a computer-readable storage medium 404 (for example, ROM or flash memory), a wireless communication subsystem 406, a user interface 408, and an I/O interface 410.

The processing unit 402 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 402 may be configured to generate control information, such as a measurement report, or respond to received information, such as control information from a network node. The processing unit 402 may also be configured to make a Radio Resource Management (RRM) decision such as cell selection/reselection information or trigger a measurement report. The processing unit 402 can also include other auxiliary components, such as random access memory (RAM) and read-only memory (ROM). The computer-readable storage medium 404 can store an operating system (OS) of the device 400 and various other computer-executable instructions, logic or software programs for performing one or more of the processes, steps, or actions described above. In some cases, the computer-readable storage medium 404 can be transitory, non-transitory, or a combination thereof.

The wireless communication subsystem 406 may be configured to provide wireless communication for voice, data, and/or control information provided by the processing unit 402. The wireless communication subsystem 406 can include, for example, one or more antennas, a receiver, a transmitter, a local oscillator, a mixer, and a digital signal processing (DSP) unit. In some implementations, the subsystem 406 can support multiple-input multiple-output (MIMO) transmissions. In some implementations, the receiver in the wireless communication subsystems 406 can be an advance receiver or a baseline receiver. Two receivers can be implemented with identical, similar, or different receiver processing algorithms.

The user interface 408 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 410 can include, for example, a universal serial bus (USB) interface.

Figure 5:
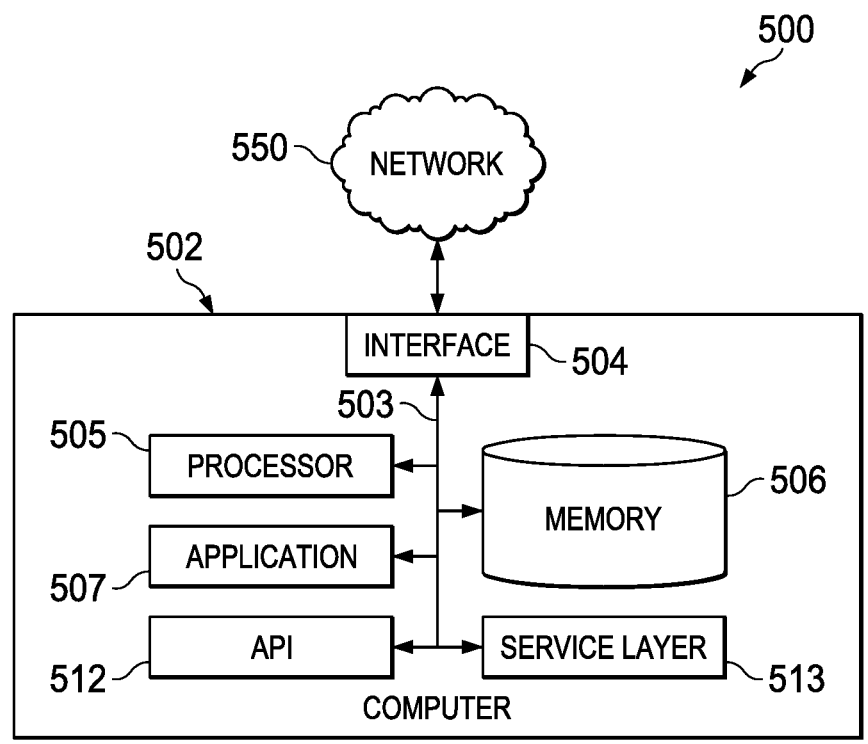
FIG. 5 is a high-level architecture block diagram of a secure community management system according to an implementation.

FIG. 5 is a high-level architecture block diagram of a secure community management system 500 according to an implementation. At a high level, the illustrated system 500 includes a secure community server 502 through a network 550. The described illustration is only one possible implementation of the described subject matter and is not intended to limit the disclosure to the single described implementation. Those of ordinary skill in the art will appreciate the fact that the described components can be connected, combined, or used in alternative ways consistent with this disclosure.

The network 550 facilitates communications between the components of the system 500. The network 550 can be a wireless or a wireline network, a memory pipe, a hardware connection, or any internal or external communication paths between the components.

The secure community server 502 includes a computing system configured to perform the algorithm described in this disclosure to manage secure communities. In some cases, the algorithm can be implemented in an executable computing code, e.g., C/C++ executable codes. Alternatively or in combination, the algorithm can be implemented in an application program, e.g., EXCEL. In some cases, the server 502 can include a standalone Linux system that runs batch applications. In some cases, the server 502 can include mobile or personal computers that run the application program.

The server 502 may include an input device, such as a keypad, keyboard, touch screen, microphone, speech recognition device, other devices that can accept user information, and/or an output device that conveys information associated with the operation of the computer 502, including digital data, visual and/or audio information, or a GUI.

The server 502 can serve as a client, network component, a server, a database or other persistency, and/or any other component of the system 500. In some implementations, one or more components of the server 502 may be configured to operate within a cloud-computing-based environment.

At a high level, the server 502 is an electronic computing device operable to receive, transmit, process, store, or manage data and information associated with the system 500. According to some implementations, the server 502 may also include or be communicably coupled with an application server, e-mail server, web server, caching server, streaming data server, business intelligence (BI) server, and/or other server.

The server 502 can receive requests over network 550 from a client application (e.g., executing on a user device) and respond to the received requests by processing the said requests in an appropriate software application. In addition, requests may also be sent to the server 502 from internal users (e.g., from a command console or by another appropriate access method), external or third parties, other automated applications, as well as any other appropriate entities, individuals, systems, or computers.

Each of the components of the server 502 can communicate using a system bus 503. In some implementations, any and/or all the components of the server 502, both hardware and/or software, may interface with each other and/or the interface 504 over the system bus 503 using an application programming interface (API) 512 and/or a service layer 513. The API 512 may include specifications for routines, data structures, and object classes. The API 512 may be either computer language-independent or -dependent and refer to a complete interface, a single function, or even a set of APIs. The service layer 513 provides software services to the server 502 and/or the system 500. The functionality of the server 502 may be accessible for all service consumers using this service layer. Software services, such as those provided by the service layer 513, provide reusable, defined business functionalities through a defined interface. For example, the interface may be software written in JAVA, C++, or other suitable languages providing data in Extensible Markup Language (XML) format or other suitable formats. While illustrated as an integrated component of the server 502, alternative implementations may illustrate the API 512 and/or the service layer 513 as stand-alone components in relation to other components of the server 502. Moreover, any or all parts of the API 512 and/or the service layer 513 may be implemented as child or sub-modules of another software module, enterprise application, or hardware module without departing from the scope of this disclosure.

The server 502 includes an interface 504. Although illustrated as a single interface 504 in FIG. 5, two or more interfaces 504 may be used according to particular needs, desires, or particular implementations of the server 502. The interface 504 is used by the server 502 for communicating with other systems in a distributed environment—including within the system 500—connected to the network 550— (whether illustrated or not). Generally, the interface 504 comprises logic encoded in software and/or hardware in a suitable combination and operable to communicate with the network 550. More specifically, the interface 504 may comprise software supporting one or more communication protocols associated with communications such that the network 550 or interface's hardware is operable to communicate physical signals within and outside of the illustrated system 500.

The server 502 includes a processor 505. Although illustrated as a single processor 505 in FIG. 5, two or more processors may be used according to particular needs, desires, or particular implementations of the server 502. Generally, the processor 505 executes instructions and manipulates data to perform the operations of the server 502. Specifically, the processor 505 executes the functionality required for provisioning enterprise services. In some cases, the processor 505 can include a data processing apparatus.

The server 502 also includes a memory 506 that holds data for the server 502. Although illustrated as a single memory 506 in FIG. 5, two or more memories may be used according to particular needs, desires, or particular implementations of the server 502. While memory 506 is illustrated as an integral component of the server 502, in alternative implementations, memory 506 can be external to the server 502.

The application 507 is an algorithmic software engine providing functionality according to particular needs, desires, or particular implementations of the server 502, particularly with respect to functionality required for provisioning enterprise service. Although illustrated as a single application 507, the application 507 may be implemented as multiple applications 507 on the server 502. In addition, although illustrated as integral to the server 502, in alternative implementations, the application 507 can be external to the server 502.

There may be any number of servers 502 associated with, or external to, the system 500 and communicating over network 550. Further, the terms "client," "user," and other appropriate terminology may be used interchangeably, as appropriate without departing from the scope of this disclosure. Moreover, this disclosure contemplates that many users may use one server 502, or that one user may use multiple servers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
    transmitting, from a first user device to a secure community server, a key distribution request, wherein the key distribution request identifies a second user device, and the first user device and the second user device are members of a same secure community managed by the secure community server;
    transmitting, from the first user device, a first portion of a recovery key to the secure community server for forwarding to the second user device, wherein the secure community server forwards the first portion of the recovery key to the second user device;
    transmitting, from the first user device, a second portion of the recovery key to the secure community server, wherein the second portion of the recovery key is stored at the secured community server without being further distributed to other user devices;
    after transmitting the first portion and the second portion of the recovery key, discarding the first portion and the second portion of the recovery key at the first user device;
    transmitting a key recovery request to the secure community server for recovering the recovery key; and
    in response to the key recovery request:
        receiving, from the secure community server, the second portion of the recovery key that has not been further distributed to other user devices, wherein the received second portion of the recovery key is encrypted using a public key of the first user device; and
        receiving the first portion of the recovery key from the second user device.

2. The method of claim 1, wherein the transmitted first portion of the recovery key is encrypted using a public key of the second user device.

3. The method of claim 1, wherein the transmitted second portion of the recovery key is encrypted using a public key of the secure community server.

4. The method of claim 1, wherein the first portion of the recovery key is forwarded to second user device in response to the key recovery request.

5. A first user device, comprising:
    at least one hardware processor;
    a non-transitory computer-readable storage medium coupled to the at least one hardware processor and storing programming instructions for execution by the at least one hardware processor, wherein the programming instructions instruct the at least one hardware processor to:
        transmit, from the first user device to a secure community server, a key distribution request, wherein the key distribution request identifies a second user device, and the first user device and the second user device are members of a same secure community managed by the secure community server;
        transmit, from the first user device, a first portion of a recovery key to the secure community server for forwarding to the second user device, wherein the secure community server forwards the first portion of the recovery key to the second user device;
        transmit, from the first user device, a second portion of the recovery key to the secure community server, wherein the second portion of the recovery key is stored at the secured community server without being further distributed to other user devices;
        after transmitting the first portion and the second portion of the recovery key, discard the first portion and the second portion of the recovery key at the first user device;

transmit a key recovery request to the secure community server for recovering the recovery key; and in response to the key recovery request:

receive, from the secure community server, the second portion of the recovery key that has not been further distributed to other user devices, wherein the received second portion of the recovery key is encrypted using a public key of the first user device; and receive the first portion of the recovery key from the second user device.

6. The first user device of claim 5, wherein the transmitted first portion of the recovery key is encrypted using a public key of the second user device.

7. The first user device of claim 5, wherein the transmitted second portion of the recovery key is encrypted using a public key of the secure community server.

8. The first user device of claim 5, wherein the first portion of the recovery key is forwarded to second user device in response to the key recovery request.

9. A non-transitory computer-readable medium containing instructions which, when executed, cause a computing device to perform operations comprising:

transmitting, from a first user device to a secure community server, a key distribution request, wherein the key distribution request identifies a second user device, and the first user device and the second user device are members of a same secure community managed by the secure community server;

transmitting, from the first user device, a first portion of a recovery key to the secure community server for forwarding to the second user device, wherein the secure community server forwards the first portion of the recovery key to the second user device;

transmitting, from the first user device, a second portion of the recovery key to the secure community server, wherein the second portion of the recovery key is stored at the secured community server without being further distributed to other user devices;

after transmitting the first portion and the second portion of the recovery key, discarding the first portion and the second portion of the recovery key at the first user device;

transmitting a key recovery request to the secure community server for recovering the recovery key; and in response to the key recovery request:

receiving, from the secure community server, the second portion of the recovery key that has not been further distributed to other user devices, wherein the received second portion of the recovery key is encrypted using a public key of the first user device; and receiving the first portion of the recovery key from the second user device.

10. The non-transitory computer-readable medium of claim 9, wherein the transmitted first portion of the recovery key is encrypted using a public key of the second user device.

11. The non-transitory computer-readable medium of claim 9, wherein the transmitted second portion of the recovery key is encrypted using a public key of the secure community server.

12. The non-transitory computer-readable medium of claim 9, wherein the first portion of the recovery key is forwarded to second user device in response to the key recovery request for recovering the first portion of the recovery key.

* * * * *

UNITED STATES PATENT AND TRADEMARK OFFICE
CERTIFICATE OF CORRECTION

| | | |
|---|---|---|
| PATENT NO. | : 10,693,639 B2 | Page 1 of 1 |
| APPLICATION NO. | : 15/445872 | |
| DATED | : June 23, 2020 | |
| INVENTOR(S) | : Bowman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 132 days.

Signed and Sealed this
Tenth Day of May, 2022

*Katherine Kelly Vidal*

Katherine Kelly Vidal
*Director of the United States Patent and Trademark Office*